United States Patent [19]

Busby

[11] Patent Number: 4,707,735
[45] Date of Patent: Nov. 17, 1987

[54] SURVEILLANCE SYSTEMS

[75] Inventor: Peter W. Busby, Stevenage, England

[73] Assignee: British Aerospace Public Limited Co., London, England

[21] Appl. No.: 807,486

[22] Filed: Dec. 10, 1985

[30] Foreign Application Priority Data

Dec. 10, 1984 [GB] United Kingdom ............... 8431082

[51] Int. Cl.[4] ............................................. H04N 7/18
[52] U.S. Cl. ................................. 358/108; 358/105; 358/109; 358/87; 358/213.26; 358/213.29
[58] Field of Search ................. 358/105, 108, 213, 87, 358/109

[56] References Cited

U.S. PATENT DOCUMENTS

| | | | |
|---|---|---|---|
| 3,851,096 | 11/1974 | Collins et al. | 358/105 |
| 4,064,533 | 12/1977 | Lampe et al. | 358/105 |
| 4,396,950 | 8/1983 | Roth | 358/213 |
| 4,442,457 | 4/1984 | Pines | 358/213 |
| 4,613,898 | 9/1986 | Bagnall-Wild et al. | 358/87 |

FOREIGN PATENT DOCUMENTS 1523192 8/1978 United Kingdom .

Primary Examiner—James J. Groody
Assistant Examiner—Victor R. Kostak
Attorney, Agent, or Firm—Cushman, Darby & Cushman

[57] ABSTRACT

Rotating surveillance systems of the type which detect a moving object within a field-of-view and provide a representative image of the object may suffer from limited sensitivity when having a wide coverage. The system described herein detects and provides an identifiable image of a moving object within its field-of-view by forming an image of the object on a charge-coupled device and determining the rate of relative movement between the image and the device and hence using the rate of relative movement to provide signals which hold the image of the moving object substantially stationary with respect to the imaging sites of the charge-coupled device to produce a generally sharp image of the object compared with the background.

9 Claims, 4 Drawing Figures

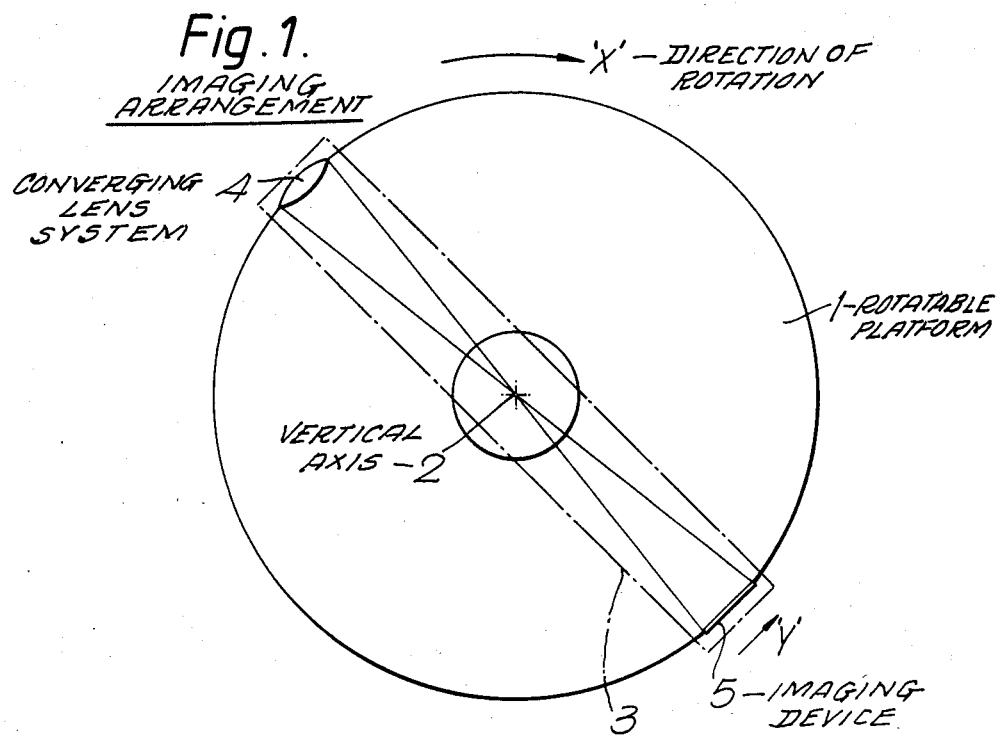
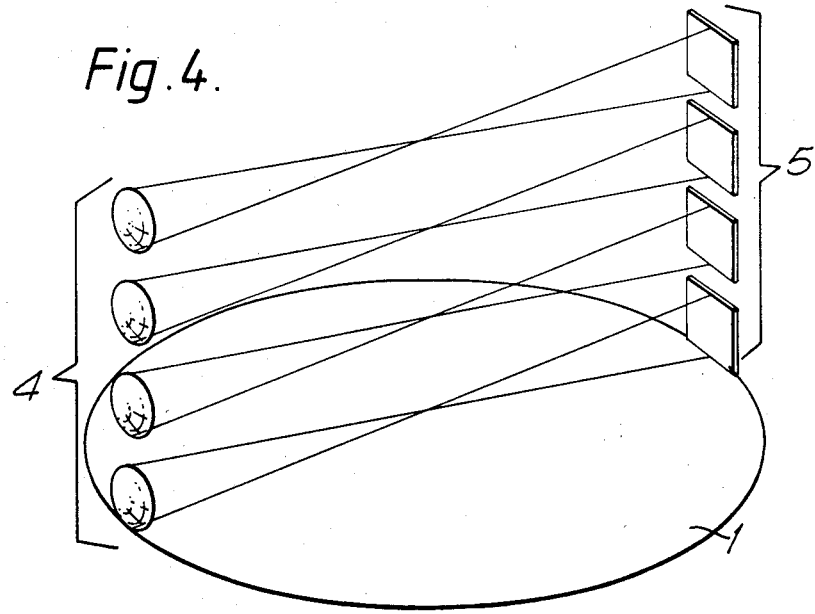

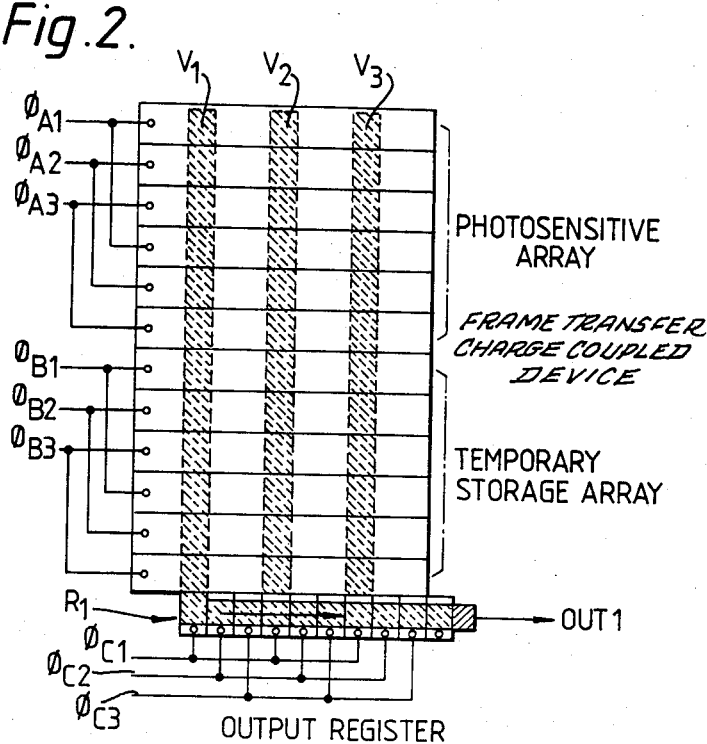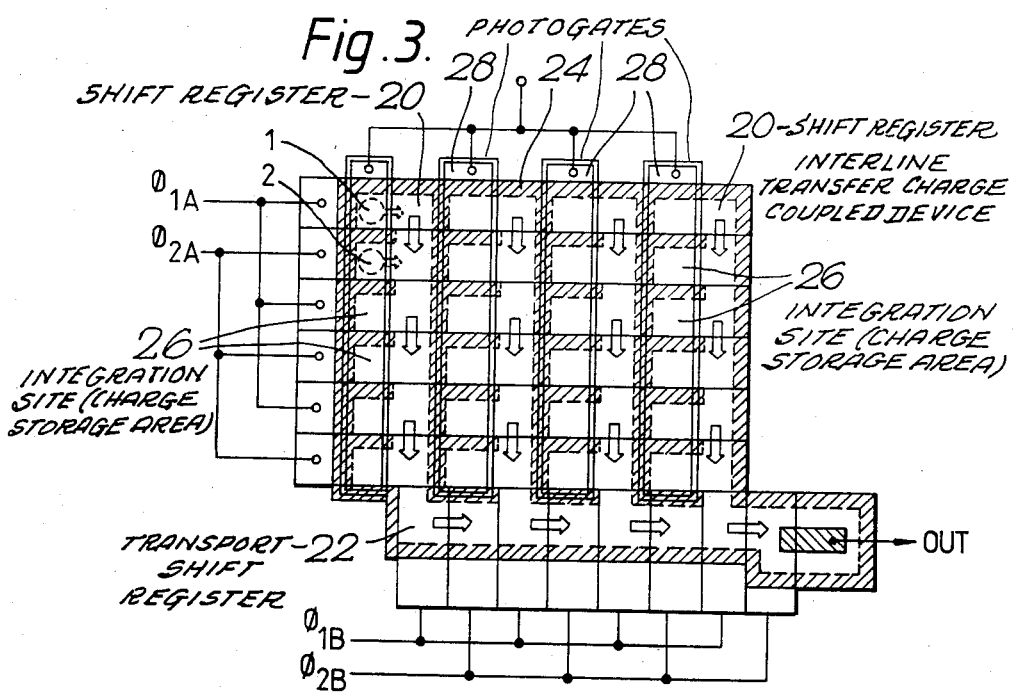

SURVEILLANCE SYSTEMS

This invention relates to surveillance systems of the type which scan a given field-of-view, can detect a moving object within that field-of-view and produce an image representative of the moving object.

In general, such systems when having wide coverage tended to have limited sensitivity i.e. the image was blurred so that identification of the object was difficult or impossible. It is therefore an object of this invention to provide a surveillance system having the same wide coverage but with improved sensitivity.

According to the present invention, there is provided a passive surveillance system for detecting and for providing an identifiable image of a moving object with respect to the background including:
  imaging means;
  scanning means to effect scanning of the imaging means about a given axis;
  the imaging means including a charge-coupled device having a photosensitivie portion for receiving the image of a viewed scene, the photosensitive portion having a plurality of lines comprising individual photosensitive elements which hold induced charge in response to that part of the image falling on them, and a transport register for sequentially receiving the line charges and providing corresponding video output signals, the lines being parallel to the axis of scan;
  means for deriving electrical signals representing the rate of relative movement between the image and the charge-coupled device from the rate of rotation of the scanning means and an anticipated range of speeds of an object to be detected; and
  timing control means for controlling the transfer of line charges into the transport register in accordance with said derived electrical signals such that video output signals are provided in which the image of a moving object is held substantially stationary with respect to imaging sites of the said charge-coupled device, thereby producing a generally sharp image of said moving object compared with the background.

Preferably, said imaging means further includes storage means which is operable to hold the line charges before they are fed into the transport register.

In one embodiment having a single imaging device, the image of a moving object in the viewed scene is held substantially stationary by varying the rate of charge transfer from the photosensitive portion to the storage means and thence to the transport register according to a predetermined sequence in conjunction with the derived electrical signals.

In a further embodiment having several imaging devices, each device has its own discrete charge transfer rate. Additionally, each imaging device may have a variable charge transfer rate so as to extend the range of possible object speeds which each device may detect.

For a better understanding of the invention, reference will now be made, by way of example, to the accompanying drawings in which:

FIG. 1 is a schematic diagram of an imaging arrangement;

FIG. 2 is a diagrammatic representation of a frame transfer charge-coupled device (FTCCD);

FIG. 3 is a diagrammatic representation of an interline transfer charge-coupled device (ITCCD); and FIG. 4 is a sketch of an arrangement which employs four imaging devices.

The invention described herein is a rotating surveillance system which scans a field-of-view up to 360° in azimuth. The system is capable of detecting and 'freezing' the motion of an image of a moving object, for example a target, within the field-of-view so that an operator can identify the moving object on a conventional TV monitor. The range of motion which would normally be required to be detected and 'frozen' would fall between the extremes corresponding to an air attack (fast-moving) and a ground attack (slow-moving). It is found that the moving object is frozen with respect to the background which will, in general, remain blurred. In this respect the invention distinguishes from our UK Pat. No. 1523192 which gives only a whole frozen frame and the particular object to be identified will not stand out sufficiently.

FIG. 1 shows a rotatable platform 1 which rotates about a fixed vertical axis 2 in the direction given by arrow 'X'. A solid state imaging system, shown generally at 3, is mounted on the platform 1 and rotates with it so as to scan a scene in azimuth. The system 3 comprises a converging lens system 4 which focusses light from the viewed scene onto an imaging device 5 which is positioned at the focal plane of the lens system 4. The imaging device 5 may be a frame transfer charge-coupled device (FTCCD) or an interline transfer charge-coupled device (ITCCD), and the operation of each device is better explained with reference to FIGS. 2 and 3 respectively.

In FIG. 2, the FTCCD has vertical columns $V_1$, $V_2$ and $V_3$ which form shift registers comprising photosensitive elements isolated from one another by diffusions (the clear areas in FIG. 2) which the charge carriers are unable to cross. The image is produced by the generation of charge over the surface of the deivce in response to light from the image. Each potential well collects the charge carriers in its vicinity so that the stored charge is indicative of the average light falling on the area surrounding the conductor biased to form the potential well. Thus the image is broken up into an array of elements which are arranged in rows and columns similar to a television picture.

In normal use image data is transferred from the photosensitive array to a temporary storage array and thence to the output or transport register in response to a composite synchronisation signal. Each cycle of the synchronisation signal comprises a number of line synchronisation pulses corresponding to the number of rows in the photosensitive array, and a frame synchronisation pulse. To transfer data from the photosensitive array to the temporary storage array, voltages are selectively applied to $\phi_{A1}$, $\phi_{A2}$, $\phi_{A3}$ and $\phi_{B1}$, $\phi_{B2}$ and $\phi_{B3}$. Thus, a charge can be transferred from a potential "well" under a $\phi_{A1}$ electrode by creating a deeper potential well under the $\phi_{A2}$ electrode, after which the potential well under the $\phi_{A1}$ electrode can be eliminated and the "depth" of that under the $\phi_{A2}$ electrode can be reduced. However, it is not essential to create some potential wells which are deeper than others; charge can be transferred by the application of suitably timed asymmetric drive pulses, all of the same amplitude, to the connections. When the information in the storage array is to be read, at each line synchronisation pulse, a row of information is transferred from the temporary storage array into the transfer shift register $R_1$. The data in the shift register is clocked out during the interval before the next line synchronisation pulse. When the frame syncrhonisation pulse occurs, the temporary storage array has been emptied by the line synchronisation pulses and a further set of image-representing charge data therefore can then be transferred from the photosensitive array into the temporary storage array. The time between successive frame synchronisation pulses therefore represents the integration time of the charge coupled image.

Each line syncrhonisation pulse feeds a clocking pulse by the $\phi_{B1}$, $\phi_{B2}$ and $\phi_{B3}$ inputs of the temporary storage array (FIG. 2) so that a row of information is transferred from the temporary storage array into the transport shift register. This row of data is clocked out by $\phi_{C1}$, $\phi_{C2}$ and $\phi_{C3}$ during the interval before the next line synchronisation pulse.

For a static image, the generator (not shown) operates in response to each frame synchronisation pulse to transfer data from the photosensitive array into the empty temporary storage array. This is achieved by clocking the $\phi_{A1}$, $\phi_{A2}$, $\phi_{A3}$ inputs and the $\phi_{B1}$, $\phi_{B2}$, $\phi_{B3}$ inputs in unison with one another. However, where image movement occurs along the line of the columns of the photosensitive array, $\phi_{A1}$, $\phi_{A2}$, $\phi_{A3}$ are clocked during the interval between the frame pulses, that is to say during the integration period of the device, so that the charge pattern follows the image.

The image is considered to move across the device from the top of the photosensitive array, eventually passing over the temporary storage array, and then off the device altogether.

The transfer of charge into the storage area is used to correct for image movement, and this charge kept in correct relation with the rest of the image charge pattern.

An interline transfer charge coupled device as shown in FIG. 3, can be used instead of the FTCCD of FIG. 2. This device has vertical charge-coupled sift registers 20 to transfer charge into a horizontal output or transport shift register 22. The generated charge is stored in adjacent integration areas or sites 26 which can be isolated from the registers by a photogate 28. The accumulated charge is then transferred from these integration sites 26 into the columns, to be clocked out, line by line, by opening the photogate.

Referring to FIGS. 1, 2 and 3, the CCD 5 is arranged so that the image traverses the device in the direction of arrow 'Y' and the output or transport register is mounted perpendicular to the plane of the platform 1 but parallel to the axis 2. As the platform 1 is driven at a given angular frequency, the clocking frequency of the CCD 5 is chosen so that it is directly proportional to the rotational frequency, and compensates for the anticipated speed of a moving object, ie the image of the moving object is held stationary with respect to the device.

If only one imaging device is used, the clocking frequency ie the rate of charge transfer is varied according to a predetermined sequence so that objects travelling at different speeds may be detected. The shift registers are clocked in the opposite direction to the direction of rotation ie in the direction of arrow 'Y' so as to compensate for the relative movement between a moving object in the viewed scene and the CCD is achieved as mentioned previously. Therefore, by varying the clocking frequency, when one imaging device is used, a range of possible object speeds can be anticipated. If, on the other hand, more than one imaging device is used (as shown in FIG. 4), each device is clocked to anticipate one discrete object speed ie the clocking frequency of each device forms a different but constant ratio with the rotational frequency.

When more than one imaging device is used, the devices may be arranged to form a vertical bank as shown in FIG. 4. Alternatively, the devices may be arranged in some other way e.g. around the periphery of the platform 1, depending on the coverage required.

If an object is moving in the direction 'X' the clocking frequency is higher than if the object is moving in the direction 'Y', the CCD still being clocked in the direction 'Y'. As a result, the images of the stationary background are blurred and will average out to a constant 'grey' level, and a moving object travelling through the background at a rate coinciding with the clocking frequency will form an image which appears in sharp contrast on the CCD.

Having detected a moving object, the clock frequency relating to the CCD concerned may be further tuned to match the object speed perfectly, and the object may then be displayed on a conventional TV monitor for recognition.

When used with conventional monitors, the output register and the vertical column shift registers have to operate at compatible frequencies e.g. 15625 Hz to empty the output register, and 50 Hz to load lines into the output register. For a rotational speed of one revolution per second, the azimuth resolution will be 40 mrads and for a similar elevation resolution, using a 400 horizontal element sensor, the field-of-view will be 9.2°.

A more versatile method of processing the output information from the CCD is to store it in a limited capacity digital frame store before displaying it as a TV raster. The main advantage of doing this, is that the object can be further defined by applying suitable algorithms to the stored data. The stored information may also be strobed in such a way that any particular section of 12.3° out of the total field of 360° may be displayed e.g. a sector containing a moving object.

The surveillance system described operates in the visible or near infrared region of the electromagnetic spectrum but a 'night-time' capability may be achieved by including suitable image intensifiers.

The rotation rate of the platform may be checked using an optical pick-off method but this is not essential. However, by accurately controlling the rate of rotation undesirable variations can be removed.

I claim:

1. A passive surveillance system for detecting and for providing an identifiable image of a moving object with respect to the background including:
   imaging means;
   scanning means to effect scanning of the imaging means about a given axis;
   the imaging means including a charge-coupled device having a photosensitive portion for receiving the image of a viewed scene, the photosensitive portion having a plurality of lines comprising individual photosensitive elements which hold induced charge in response to that part of the image falling on them, and a transport register for sequentially receiving the line charges and providing corresponding video output signals, the lines being parallel to the axis of scan;
   means for deriving electrical signals representing the rate of relative movement between the image and the charge-coupled device from the rate of rotation of the scanning means and an anticipated range of speeds of an object to be detected; and timing control means for controlling the transfer of line charges into the transport register in accordance with said derived electrical signals such that said video output signals are provided in which the image of a moving object is held substantially stationary with respect to imaging sites of the said charge-coupled device, thereby producing a generally sharp image of said moving object compared with the background.

2. A system according to claim 1, wherein said imaging means further includes storage means which is operable to hold the line charges before they are fed into the transport register.

3. A system according to claim 2, wherein said imaging means comprises a single imaging device, and the image of a moving object in the viewed scene is held substantially stationary by varying the rate of charge transfer from the photosensitive portion to the storage means and then to the transport register according to a predetermined sequence in conjunction with the derived electrical signals.

4. A system according to claim 2, wherein said imaging means comprises a plurality of imaging devices, each device having its own discrete charge transfer rate.

5. A system according to claim 4, wherein each imaging device has a variable charge transfer rate so as to extend the range of possible object speeds it detects.

6. A system according to claim 1, wherein said imaging means comprises a frame transfer charge coupled device.

7. A system according to claim 1, wherein said imaging means comprises an interline transfer charge coupled device.

8. A system according to claim 1, wherein the scanning means is a rotatable platform.

9. A system according to claim 8, wherein said charge transfer rate is proportional to the rate of rotation of said platform.

* * * * *